(12) United States Patent
Divakaran et al.

(10) Patent No.: US 12,401,674 B2
(45) Date of Patent: Aug. 26, 2025

(54) SYSTEMS AND METHODS FOR DETECTING VULNERABILITIES IN INTERNET-OF-THINGS (IOT) DEVICES

(71) Applicant: Acronis International GmbH, Schaffhausen (CH)

(72) Inventors: Dinil Divakaran, Singapore (SG); Serg Bell, Costa del Sol (SG); Stanislav Protasov, Singapore (SG); Philipp Gysel, Bern (CH)

(73) Assignee: Acronis International GmbH, Schaffhausen (CH)

( * ) Notice: Subject to any disclaimer, the term of this patent is extended or adjusted under 35 U.S.C. 154(b) by 284 days.

(21) Appl. No.: 18/082,724

(22) Filed: Dec. 16, 2022

(65) Prior Publication Data
US 2024/0205257 A1      Jun. 20, 2024

(51) Int. Cl.
*H04L 9/40*         (2022.01)
(52) U.S. Cl.
CPC ................ *H04L 63/1433* (2013.01)
(58) Field of Classification Search
CPC .................................................. H04L 63/1433
See application file for complete search history.

(56) References Cited

U.S. PATENT DOCUMENTS

| 9,210,176 | B2* | 12/2015 | Sobel | H04W 12/086 |
| 11,115,799 | B1* | 9/2021 | Du | H04L 63/205 |
| 2019/0166091 | A1* | 5/2019 | Gupta | H04L 61/2571 |
| 2019/0306023 | A1* | 10/2019 | Vasseur | G06N 20/20 |
| 2020/0160100 | A1* | 5/2020 | Mermoud | H04L 47/20 |
| 2020/0396129 | A1* | 12/2020 | Tedaldi | H04L 41/0893 |
| 2021/0377215 | A1* | 12/2021 | Wang | H04L 63/20 |

(Continued)

FOREIGN PATENT DOCUMENTS

WO    2020/118376 A1    6/2020

OTHER PUBLICATIONS

Yair et al., "ProfilloT: a machine learning approach for IoT device identification based on network traffic analysis," In Proceedings of the Symposium on Applied Computing, pp. 506-509, 2017.

(Continued)

*Primary Examiner* — Oleg Survillo
(74) *Attorney, Agent, or Firm* — ArentFox Schiff LLP; Michael Fainberg (57) ABSTRACT

Disclosed herein are systems and method for detecting vulnerabilities in devices within a network. In one exemplary aspect, a method includes: intercepting a plurality of packets in a network with a plurality of devices; identifying a subset of packets corresponding to a first device of the network; extracting and embedding a plurality of features representing device behavior from the subset of packets into an input vector; executing a machine learning algorithm that receives the input vector and outputs a device type of the first device, wherein the machine learning algorithm is trained using a training dataset including network traffic information labelled with device types and a list of attributes of each respective device type; performing, for the first device, a security scan specific to the device type; and in response to detecting a vulnerability based on the security scan, generating a vulnerability assessment report for the first device.

18 Claims, 6 Drawing Sheets

(56) References Cited

U.S. PATENT DOCUMENTS

2021/0406720 A1* 12/2021 Song .................. H04L 63/0227
2022/0245258 A1*  8/2022 Shivanna .............. G06F 21/577
2023/0384746 A1* 11/2023 Reynolds ............... G05B 17/02
2024/0095779 A1*  3/2024 Maity .................... G06N 5/022
2024/0205257 A1*  6/2024 Divakaran .......... H04L 63/1433

OTHER PUBLICATIONS

Thangavelu et al. "DEFT: A Distributed IoT Fingerprinting Technique," IEEE Internet of Things Journal, vol. 6, No. 1, pp. 940-952, Feb. 2019.

Pinheiro et al., "Identifying IoT devices and events based on packet length from encrypted traffic." Computer Communications, vol. 144, pp. 8-17, 2019.

Dong et al., "Your Smart Home Can't Keep a Secret: Towards Automated Fingerprinting of IoT Traffic," In ACM Asia Conf. on Computer and Communications, 2020.

Trimananda et al. "Packet-level signatures for smart home devices," In Network and Distributed Systems Security (NDSS) Symposium, 2020.

Yu et al., "You Are What You Broadcast: Identification of Mobile and IoT Devices from (Public) WiFi," In 29th USENIX Security Symposium, pp. 55-72, 2020.

Chakraborty et al., "Cost-aware Feature Selection for IoT Device Classification," IEEE Internet of Things Journal, 2021.

\* cited by examiner

FIG. 6

SYSTEMS AND METHODS FOR DETECTING VULNERABILITIES IN INTERNET-OF-THINGS (IOT) DEVICES

FIELD OF TECHNOLOGY

The present disclosure relates to the field of cybersecurity, and, more specifically, to systems and methods for detecting vulnerabilities in Internet-of-Things (IOT) devices.

BACKGROUND

Offices, homes, enterprises, and different industry verticals today have numerous Internet-of-Things (IOT) devices connected to their networks. Example devices include smart thermostats, hubs, lighting systems, alarms, TVs, wearables, etc. While IoT devices enable new and efficient services, they also pose security threats (e.g., as witnessed in Mirai and Hajime attacks). A single vulnerability can affect a large number of homes/offices because a specific device might be deployed in large numbers. The number of manufacturers is large and volatile in this emerging market and some manufacturers do not last as long as their devices do. Accordingly, if a device is affected with by a malicious party after a manufacturer is no longer in business, security updates or recalls are not possible.

Often times, offices and homes might not be tracking the devices in their network, the way their communications evolve over time, the new vulnerabilities the devices expose, etc. This is propelled by the fact that unlike traditional computing systems, IoT devices are often left unattended—being setup once and subsequently left in place without proactive interaction with by the user directly. As the number of devices keeps growing, devices may remain in the network unattended by the users and admins, and even likely unpatched against known vulnerabilities, increasing the risk of being exploited by attackers, and consequently leading to larger damages.

There thus exists a need for IoT devices in homes/offices/enterprises to be identified for security purposes and scanned for vulnerabilities.

SUMMARY

In one exemplary aspect, the techniques described herein relate to a method for detecting vulnerabilities in devices within a network, the method including: intercepting a plurality of packets being transmitted in a network with a plurality of devices; identifying, from the plurality of packets, a subset of packets corresponding to a first device of the network; extracting a plurality of features representing device behavior from the subset of packets; embedding the plurality of features into an input vector; executing a machine learning algorithm that receives the input vector and outputs a device type of the first device, wherein the machine learning algorithm is trained using a training dataset including network traffic information labelled with device types and a list of attributes of each respective device type; performing, for the first device, a security scan specific to the device type to detect vulnerabilities in the first device; and in response to detecting a vulnerability based on the security scan, generating a vulnerability assessment report for the first device.

In some aspects, the techniques described herein relate to a method, wherein a different security scan is performed for a different device type based on results of the machine learning algorithm.

In some aspects, the techniques described herein relate to a method, further including: identifying, from the plurality of packets, another subset of packets corresponding to a second device of the network; extracting another plurality of features representing device behavior from the another subset of packets; embedding the another plurality of features into another input vector; executing the machine learning algorithm that receives the another input vector and outputs the different device type of the second device; performing, for the second device, the different security scan specific to the different device type to detect vulnerabilities in the second device; and in response to detecting a vulnerability based on the different security scan, generating a vulnerability assessment report for the second device.

In some aspects, the techniques described herein relate to a method, wherein identifying the subset of packets includes: determining a device identifier in a first packet of the plurality of packets; and identifying, from the plurality of packets, the subset of packets that include the device identifier.

In some aspects, the techniques described herein relate to a method, wherein the machine learning algorithm further outputs a respective prediction probability that indicates an accuracy of a predicted device type, further including: performing, for the first device, the security scan in response to determining that a prediction probability associated with the first device is greater than a threshold probability.

In some aspects, the techniques described herein relate to a method, wherein the security scan is not performed for devices for which prediction probabilities associated with corresponding predictions are not greater than the threshold probability.

In some aspects, the techniques described herein relate to a method, wherein the machine learning algorithm has a zero-shot learning framework.

In some aspects, the techniques described herein relate to a method, wherein the plurality of features are one or both of: sequence-based features obtained by extracting raw values for each packet in a continuous sequence, and aggregation-based features obtained by engineering aggregate features from network traffic sessions, wherein a network traffic session is a time-window of packets generated by a given device.

In some aspects, the techniques described herein relate to a method, wherein an attribute of the list of attributes describes one of: a type of device, a network parameter of the device, a relationship of the device with other devices, a high-level characterization of the network traffic generated.

In some aspects, the techniques described herein relate to a method, further including performing a remediation action that resolves the detected vulnerability of the first device.

It should be noted that the methods described above may be implemented in a system comprising a hardware processor. Alternatively, the methods may be implemented using computer executable instructions of a non-transitory computer readable medium.

In some aspects, the techniques described herein relate to a system for detecting vulnerabilities in devices within a network, including: a memory; and a hardware processor communicatively coupled with the memory and configured to: intercept a plurality of packets being transmitted in a network with a plurality of devices; identify, from the plurality of packets, a subset of packets corresponding to a first device of the network; extract a plurality of features representing device behavior from the subset of packets; embed the plurality of features into an input vector; execute a machine learning algorithm that receives the input vector and outputs a device type of the first device, wherein the machine learning algorithm is trained using a training dataset including network traffic information labelled with device types and a list of attributes of each respective device type; perform, for the first device, a security scan specific to the device type to detect vulnerabilities in the first device; and in response to detecting a vulnerability based on the security scan, generate a vulnerability assessment report for the first device.

In some aspects, the techniques described herein relate to a non-transitory computer readable medium storing thereon computer executable instructions for detecting vulnerabilities in devices within a network, including instructions for: intercepting a plurality of packets being transmitted in a network with a plurality of devices; identifying, from the plurality of packets, a subset of packets corresponding to a first device of the network; extracting a plurality of features representing device behavior from the subset of packets; embedding the plurality of features into an input vector; executing a machine learning algorithm that receives the input vector and outputs a device type of the first device, wherein the machine learning algorithm is trained using a training dataset including network traffic information labelled with device types and a list of attributes of each respective device type; performing, for the first device, a security scan specific to the device type to detect vulnerabilities in the first device; and in response to detecting a vulnerability based on the security scan, generating a vulnerability assessment report for the first device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting vulnerabilities in Internet-of-Things (IOT) devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

To address the issues discussed in the background, the present disclosure describes detecting all IoT devices in a network and subsequently monitoring them for vulnerabilities and estimating associated risks. It should be noted that the detection and identification of IoT devices is non-trivial as most devices do not offer a meaningful name and description reachable over the network. Accordingly, the present disclosure describes utilizing network traffic data for identification purposes. In an exemplary aspect, a supervised learning algorithm is applied that trains on large sets of labeled network traffic of IoT devices to perform identification of IoT devices. Once identified, the IoT devices are actively and regularly scanned to detect potential vulnerabilities they are exposed to.

Because new IoT devices are introduced into the market every day, there will likely be devices in a network for which no training data is available for identification. In other words, it is impractical to assume traffic of all devices will be available to train a model. Thus, an approach is needed that can classify never-before-seen IoT devices. In an exemplary aspect, the present disclosure addresses this concern by defining IoT attributes that allow the use of zero-shot learning for identifying unseen devices. In particular, network scanning is performed along with multiple predictions to improve the confidence of device prediction and to provide a vulnerability assessment report.

In a high-level example, the following steps are described in the present disclosure. The first step involves training a ZSL framework (DL model) using features from network traffic of only seen IoT devices, where one set of features is extracted from a set of packets corresponding to single device (identified by MAC or src IP address). The trained model is later used to predict the type of a device and the device can be from seen or unseen classes. Again, network traffic is processed, features are extracted and given as input to the trained model. Based on the top-k predictions, a vulnerability scan is performed to, both, increase the confidence of the prediction (and confirm a device type) as well as obtain a vulnerability assessment report.

Figure 1:
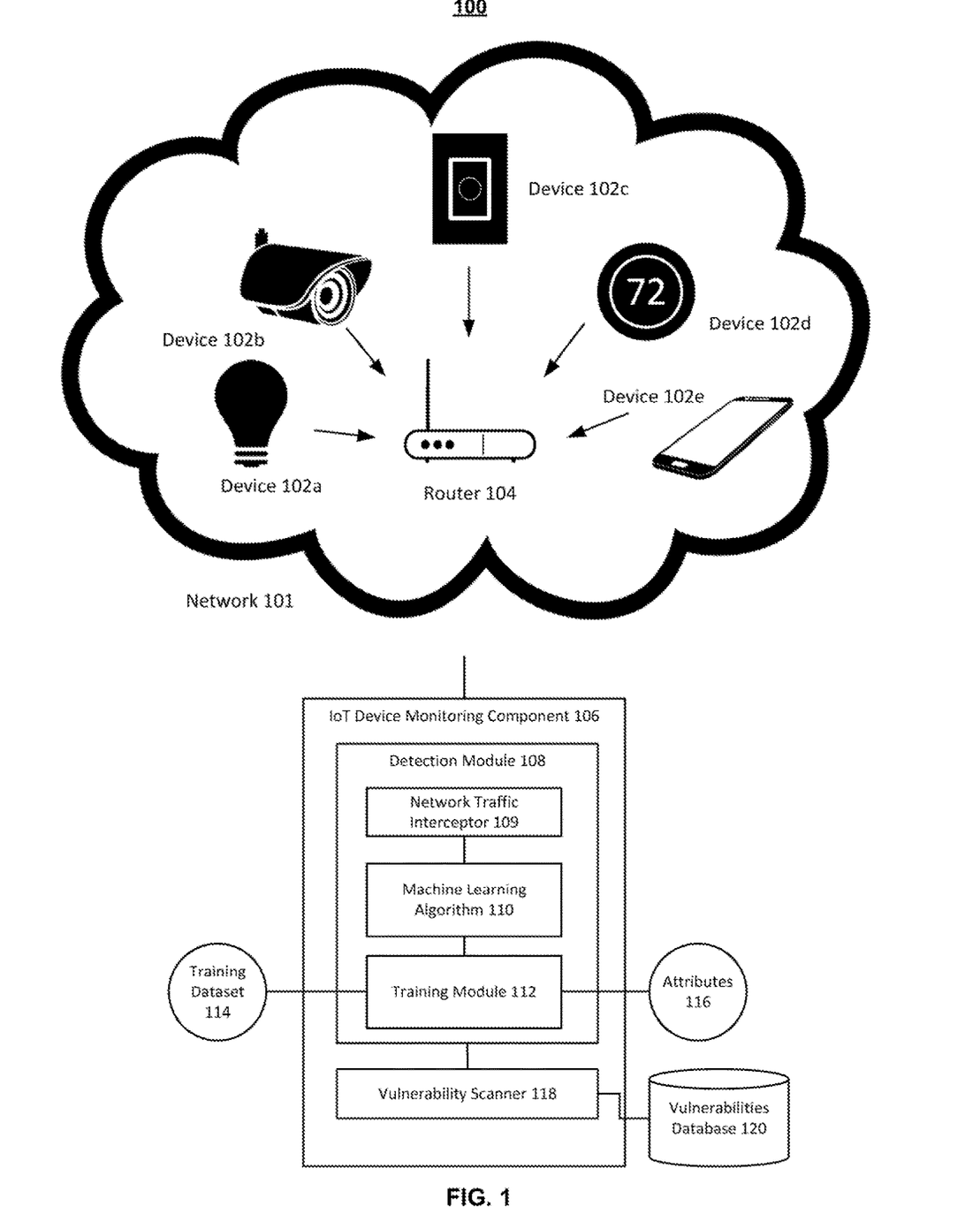
FIG. 1 is a block diagram illustrating a system for detecting vulnerabilities in Internet-of-Things (IOT) devices.

FIG. 1 is a block diagram illustrating system 100 for detecting vulnerabilities in Internet-of-Things (IOT) devices. System 100 includes network 101, which may include a plurality of IoT devices 102 installed in an office, a home, a factory, etc. Example IoT devices include a smart light (e.g., device 102a), a smart camera (e.g., device 102b), a smart switch (e.g., device 102c), a smart thermostat (e.g., device 102d), and a smartphone (e.g., device 102e). Each of the devices may be connected via a local area network (LAN) or a wide area network (WAN) such as the Internet. More specifically, each of the devices 102 may be connected to a Wi-Fi network via router 104. It should be noted that the size of network 101 and the number of connection points (e.g., routers) may vary. The limited number of devices and routers shown in FIG. 1 is for simplicity.

System 100 also includes IoT device monitoring component 106, which may be installed on a computer system (described in FIG. 6) that is connected to network 101. IoT device monitoring component 106 includes detection module 108, which has the capability to identify IoT devices using machine learning algorithm 110. Detection module 108 may also include a packet sniffing module such as network traffic interceptor 109 and a training module 112 that trains machine learning algorithm 110.

In some aspects, machine learning algorithm 110 is trained by training module 112, which accesses training dataset 114 and attributes 116 for training purposes. Using machine learning algorithm 110, detection module 108 may also be able to detect devices whose network traffic flows (packets) are not available during training of its machine learning algorithm. More specifically, IoT devices may be split into two categories: seen and unseen groups, such that the traffic flows of seen devices are available and used for training, and that of unseen devices are not available during training. For example, device 102a, device 102b, device 102c, and device 102e may be seen devices, whereas device 102d may be unseen. This means that training dataset 114 may include devices that are very similar or identical to devices 102a, 102b, 102c, and 102e. It is possible that the thermostat referenced by device 102d is a brand new model that was not present in training dataset 114. However, because it may have attributes common to other devices in training dataset 114, machine learning algorithm 110 may be able to identify device 102d as a thermostat or more broadly, as a device with attributes similar to that of a thermostat. Generally speaking, detection module 108 can still identify the unseen devices probabilistically (i.e., with some level of confidence) and may perform scans on the unseen devices to confirm the type of the IoT device.

Subsequent to identifying all IoT devices 102 in network 101, IoT device monitoring component 106 may execute vulnerability scanner 118, which scans each of the identified devices to detect vulnerabilities. Examples of vulnerabilities include trackers installed by hackers (e.g., a device is forwarding information to an unknown entity), injections in code associated with the device, executions of commands originating from an unauthorized entity, frequent disconnections from network 101, an inability to install available updates/patches, etc.

In some aspects, IoT device monitoring component 106 is an end-to-end system that uses deep learning as well as active network scanning to identify and assess the vulnerabilities of IoT devices. Firstly, detection module 108 helps to create an inventory of IoT devices 102. This is helpful in tracking devices, including those that are vulnerable or outdated, and replace and patch them as and when necessary. The main features of IoT device monitoring component 106 include (1) using zero-shot learning (ZSL) to model network traffic for identifying IoT devices (both seen and unseen devices), (2) defining attributes used for the ZSL framework, (3) using multiple predictions and active scanning to increase the confidence of device-type prediction, and (4) using scan results for providing vulnerability assessment reports.

Figure 2:
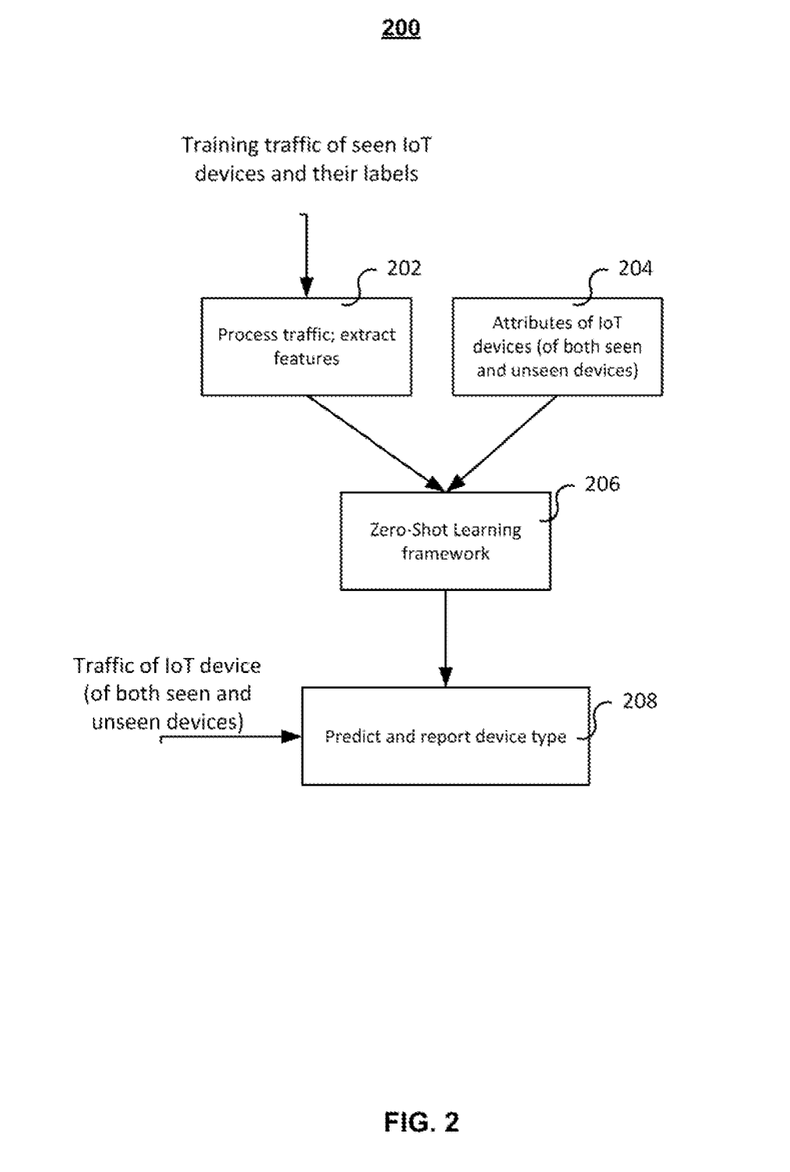
FIG. 2 is a block diagram illustrating a method for detecting IoT devices under a zero-shot learning (ZSL) framework.

FIG. 2 is a block diagram illustrating method 200 for detecting IoT devices. Training module 112 is configured to execute method 200 using training dataset 114 and attributes 116. In some aspects, training dataset 114 may include a plurality of training vectors, where each vector includes network traffic information and a label of an IoT device. At 202, training module 112 processes the network traffic information in training dataset 114 and extracts features. There are two types of features: aggregation-based features and sequence-based features. Training module 112 may extract sequence-based features and/or aggregate features.

Aggregation-based features are obtained by engineering aggregate features from network traffic sessions, where a session is a time-window of packets generated by a device. A session can have numerous 5-tuple flows, where a 5-tuple flow is defined as a set of temporally correlated packets with the same 5-tuple of source (src) IP address, destination (dst) IP address, src port, dst port, and protocol. Some of the features of interest are, the number of flows of each application type (HTTP/S, DNS, NTP, etc.), the statistics of each flow (mean, standard deviation, min, max, etc., of packet size, inter-arrival times between packets, etc.), statistics of flows (count, mean, standard deviation, min, max, etc., of flow size), number of transport layer security (TLS) flows, etc. If aggregate features are used, they are provided as a single feature vector for each session of interest (e.g., a 10-minute time window).

Sequence-based features are obtained by extracting raw values for each packet in a continuous sequence. The packet values of interest are i) packet size, time since last packet, direction of packet, transport protocol (TCP/UDP), application protocol (HTTP/S, DNS, NTP, etc.), TLS version, dst IP address category, dst port category, and src port category. If these raw features are used, then they are extracted for a sequence of packets (e.g., for 200 packets) and provided as input to the model. The sequence of packets is bidirectional and the length is configurable. The starting packet of a sequence can be fixed or randomly selected for both phases.

At 204, training module 112 identifies attributes of IoT devices. Attributes are identifiers of IoT devices and may be distributed across multiple levels of granularity. For example, at the highest level of granularity, attributes may include, but are not limited to, the types of IoT devices: hub, camera, environment sensor (e.g., smoke detector, $CO_2$ detector, thermal detector, water detector, etc.), entertainment device (e.g., TV, video/sound recorder, etc.), health monitor (e.g., wearable heart monitors), alarm system, printer, smart watch, actuator (e.g., coffee machine, door lock, etc.), power management device (e.g., smart power plugs, smart switches, etc.), lighting device (e.g., light bulb), smart assistant (e.g., Alexa, Google Home, etc.), and VOIP. In some aspect, certain types such as entertainment may have sub-categories (e.g., ambience, indoor decoration, with/without video, etc.). Similarly, cameras may have "always on" or "ad-hoc" (e.g., doorbell vs. surveillance camera) as sub-categories.

Attributes at a mid-level of granularity are specific network parameters of the IoT devices such as video upload/download capability, audio upload/download capability, low/high bandwidth, periodic (e.g., periodic activity vs. ad-hoc communication), low/high periodicity (e.g., time period between periodic communication), low/high number of application protocols (Internet protocols), multiple servers via DNS, multiple servers via IP address, ability to communicate with internal IP address, ability to communicate with external IP address, multiple connecting protocols (e.g., Wi-Fi, Bluetooth, etc.), active at night, active at day, etc. Each of these attributes may be described in a binary format (e.g., "1" for yes and "0" for no). For example, if these attributes are captured in a vector, the vector may be {1, 1, 0, . . . 0} which at least shows that the device is capable of uploading/downloading video and audio, has a low bandwidth, and is not active during the day.

Certain attributes may be relationship-based attributes, which indicate how the device behaves with other entities. For example, whether the device: reports to another IoT device, reports to a cloud network, controls another IoT device, accepts commands from other IoT device(s), accepts commands from a cloud network, receives periodic data from another IoT device, receives periodic data from a cloud network, is part of a complex system.

Attributes of an IoT device can be manually crafted or be automatically generated using scraping algorithms that will go through various online documents describing the IoT device. For example, an API of training module 112 may perform an Internet search to pull information regarding a specific IoT device (e.g., a particular smart thermostat), and such information (e.g., PDFs, texts, etc.) can be automatically processed using natural language processing algorithms to derive the attributes described above.

The attribute list can be further extended based on the details of IoT devices that become available/known over time. The process of defining and refining attributes can be achieved by using automated search combined with processing using algorithms from NLP and Deep Learning.

At 206, training module 112 provides the attributes and features to a ZSL framework to train machine learning algorithm 110. Under the ZSL framework, training module 112 trains machine learning algorithm 110 with the features extracted from training dataset 114. During the testing stage (i.e., the test dataset), the model trained using the machine learning algorithm 110 using attributes 116, is used to identify device types including those that were not observed in the training dataset. This training method decreases machine learning algorithm 110's reliance on the labelled data in training dataset 114 as it learns how to classify classes that it has not seen before.

At 208, trained machine learning algorithm 110 receives traffic of an arbitrary device and predicts and reports the device type of the arbitrary device.

In some aspects, machine learning algorithm 110 includes a long short-term memory (LSTM) model, a transformer, or any other model. The ZSL framework has multiple design options resulting in different approaches. For example, one approach is a generative model with a conditional variational auto-encoder (VAE).

Figure 3:
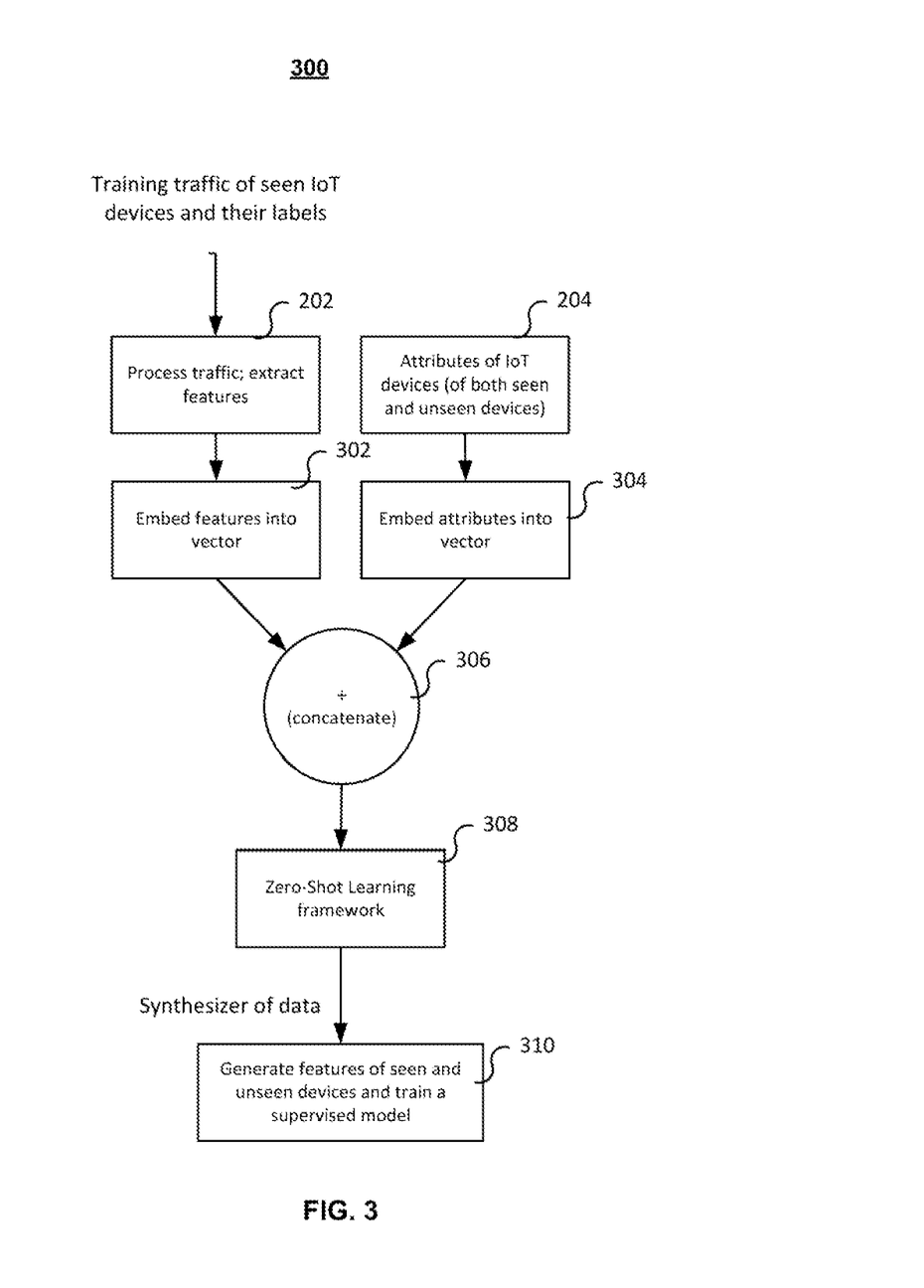
FIG. 3 is a block diagram illustrating a method for training a machine learning algorithm to detect IoT devices under a ZSL framework to synthesize features of unseen devices.

FIG. 3 is a block diagram illustrating method 300 for training a machine learning algorithm to detect IoT devices under a zero-shot learning framework. Method 300 is an expanded version of method 200. For example, after training module 112 extracts features in 202 and attributes in 204, method 300 advances to 302 and 304, respectively. At 302 and 304, training module 112 embeds features and attributes, respectively, into vectors. The embeddings can be obtained using one algorithm (e.g., Word2Vec) for both features and device attributes, or using different algorithms. At 306, training module 112 concatenates the embeddings into one input vector. At 308, training module 112 provides the attributes and features to a ZSL framework to train machine learning algorithm 110. The ZSL framework creates a data synthesizer as the output. At 310, the data synthesizer generates features of seen and unseen devices and trains a supervised model (i.e., machine learning algorithm 110).

Figure 4:
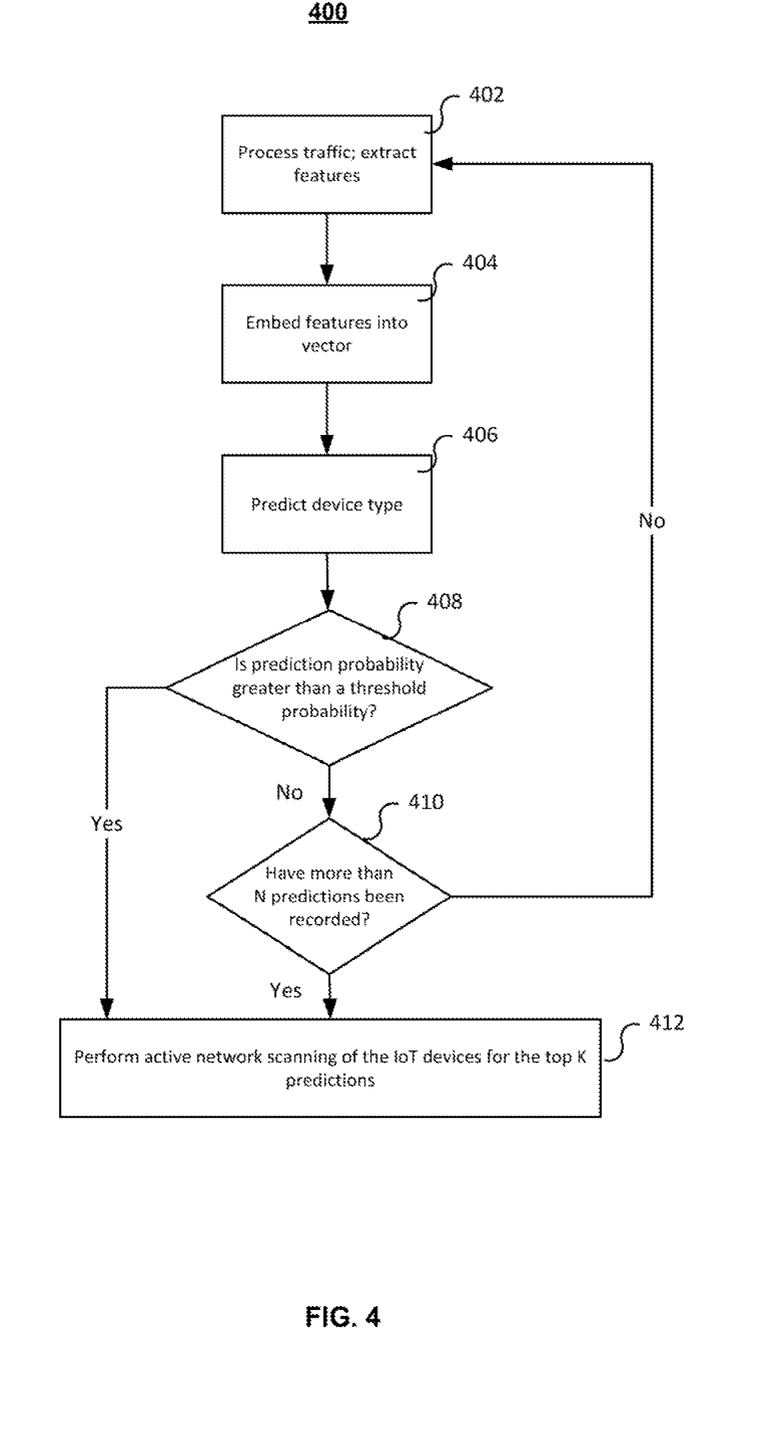
FIG. 4 is a block diagram illustrating a method for evaluating device type predictions.

FIG. 4 is a block diagram illustrating method 400 for evaluating device type predictions after the machine learning algorithm has been trained. At 402, machine learning algorithm 110 processes network traffic information intercepted by network traffic interceptor 109 and extracts features for classification. For the sequence-based features, machine learning algorithm 110 may randomly decide the first packet in the sequence for each iteration of this step (i.e., choose a random sequence of packets for extracting features each time). For the first iteration, however, the first packet in the trace may be used as the first packet in the sequence. In some aspects, network traffic interceptor 109 may perform filtered packet sniffing in which an identifier such as MAC address or source IP address or destination IP address is identified in the first packet and only subsequent packets that match the identifier are intercepted for a given sequence. Thus, all packets in the given sequence are associated with a particular device. In other aspects, network traffic interceptor 109 may perform unfiltered packet sniffing in which all packets in network 101 are intercepted within a period of time and are then grouped based on the identifier. This aspect yields multiple sequences, wherein each sequence is associated with a different device.

At 404, machine learning algorithm 110 embeds the features into a vector (as described in 302 of FIG. 3). At 406, machine learning algorithm 110 predicts a device type for a device associated with the extracted features. Each prediction of the device type includes a prediction probability, which represents the likelihood of the device type being accurate. The prediction probability is a confidence score that can be compared to a threshold probability. Suppose that the threshold probability is 80%. If the prediction probability is 85%, which is greater than the threshold probability, the device being categorized is likely to be an IoT device of the device type. If the prediction probability is lower than the threshold probability, the device in question may not be an IoT device.

At 408, vulnerability scanner 118 determines whether the prediction probability is greater than the threshold probability. If the prediction probability is greater than the threshold probability, the prediction is recorded and method 400 advances to 412, where vulnerability scanner 118 performs active scanning to confirm the device type and obtain vulnerability assessment report. If at 408, the prediction probability is not greater than the threshold probability, then method 400 returns to 402. If at least N such iterations of model predictions have been performed, method 400 advances to 412. The reason N predictions are necessary is because for a first set of features, a given IoT device may be identified as a first device type. For a second set of features, the same IoT device may be identified as a second device type. By having multiple predictions, the highest prediction probability for a given device can be identified and associated with the given device.

Accordingly, at 412, vulnerability scanner 118 determines the top K predictions (where k is a parameter) from all iterations. In this case, a top prediction for a given device is the prediction with the highest prediction probability. For each of the K devices, vulnerability scanner 118 performs active network scanning to generate a vulnerability assessment report.

Figure 5:
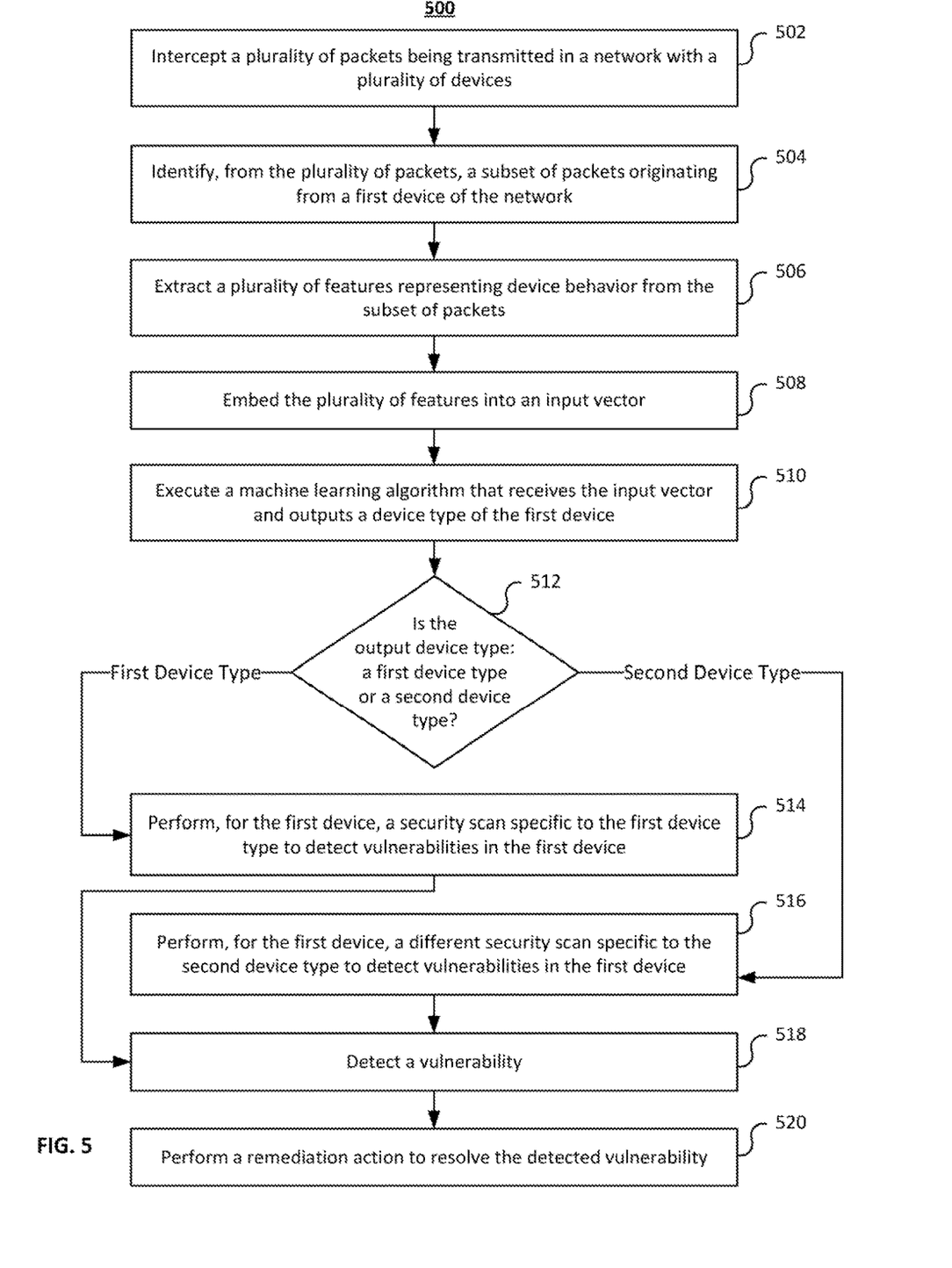
FIG. 5 illustrates a flow diagram of a method for detecting vulnerabilities in IoT devices.

FIG. 5 illustrates a flow diagram of method 500 for detecting vulnerabilities in IoT devices. At 502, network traffic interceptor 109 intercepts a plurality of packets being transmitted in network 101 with a plurality of devices 102 (e.g., device 102a, device 102b, etc.). At 504, network traffic interceptor 109 identifies, from the plurality of packets, a subset of packets corresponding to a first device (e.g., device 102a) of network 101. For example, network traffic interceptor 109 may determine a device identifier (e.g., an IP address) in a first packet of the plurality of packets. This IP address may belong to device 102a. Network traffic interceptor 109 may then filter out all packets that do not reference the device identifier. This leaves the subset of packets that includes the device identifier (e.g., as a source IP address where the packet(s) originate from and/or a destination IP address where the packet(s) are transmitted to).

At 506, detection module 108 extracts a plurality of features representing device behavior from the subset of packets. In some aspects, the plurality of features are one or both of: sequence-based features obtained by extracting raw values for each packet in a continuous sequence, and aggregation-based features obtained by engineering aggregate features from network traffic sessions, wherein a network traffic session is a time-window of packets generated by a given device. At 508, detection module 108 embeds the plurality of features into an input vector.

In some aspects, the extraction and embedding are performed by machine learning algorithm 110. For example, machine learning algorithm 110 may be a neural network that receives the subset of packets and performs feature extraction and embeddings in one or more neural network layers. In other aspects, the extraction and embedding are performed by network traffic interceptor 109. In yet some other aspects, the extraction and embedding are performed by a parsing module that is a part of detection module 108 (not shown in FIG. 1).

At 510, detection module 108 executes machine learning algorithm 110 that receives the input vector and outputs a device type of the first device. As discussed previously, machine learning algorithm 110 is trained, by training module 112, using training dataset 114 comprising network traffic information labelled with device types and a list of attributes 116 of each respective device type. More specifically, for seen devices the network traffic information is labelled with the appropriate device type. For unseen devices, the network traffic information is not available. Instead, the list of attributes is used for unseen devices. In some aspects, an attribute of the list of attributes 116 describes one of: a type of device, a network parameter of the device, a relationship of the device with other devices. In some aspects, machine learning algorithm 110 has a zero-shot learning framework.

At 512, vulnerability scanner 118 determines whether the device type outputted by machine learning algorithm 110 is a first device type or a second device type. In response to determining that the device type is a first device type (e.g., smart lightbulb), method 500 advances to 514, where vulnerability scanner 118 performs, for the first device, a security scan specific to the first device type to detect vulnerabilities in the first device. In response to determining that the device type is a second device type (e.g., smart security camera), method 500 advances to 516, where vulnerability scanner 118 performs, for the first device, a different security scan specific to the second device type to detect vulnerabilities in the first device.

In some aspects, machine learning algorithm 110 further outputs a respective prediction probability that indicates an accuracy of a predicted device type. Vulnerability scanner 118 performs, for the first device, the security scan in response to determining that a prediction probability associated with the first device is greater than a threshold probability. Security scans are not performed for devices for which prediction probabilities associated with corresponding predictions are not greater than the threshold probability.

At 518, vulnerability scanner 118 detects a vulnerability. For example, vulnerability scanner 118 may refer to vulnerabilities database 120, which indicates the type of security scan to run for each known device type. Because each device type has different inputs, processes, and outputs, the security scan performed by vulnerability scanner 118 is catered to the device type. The "smart lightbulb" device type is associated with an on/off function and a dimming function. Vulnerability scanner 118 may perform the security scan on another plurality of packets specific to device 102a (identified as a smart lightbulb) and evaluate (1) whether the payloads of the packets include references to the functions, (2) the frequency of the functions, (3) the timings of the functions, (4) battery information in the packets, (5) whether the packets originate from authorized entities/devices, etc. Suppose that the battery information indicates that device 102a is about to shut down, or the packets are originating from or being forwarded to an unknown entity, or the on/off function is sent more than a threshold amount of times within a short period of time (indicating that device 102a is potentially not turning on or off as directed, etc.). These occurrences detected by the security scan specific to smart lightbulbs indicate vulnerabilities (i.e., the device is not performing as it should).

In some aspects, in response to detecting a vulnerability based on the security scan, vulnerability scanner 118 generates a vulnerability assessment report for the first device. The vulnerability assessment report may list any vulnerabilities detected, the time period associated with the vulnerabilities, possible remediation actions, etc. In some aspects, a single vulnerability assessment report may be generated after all devices in network 101 have been identified and scanned. The single vulnerability assessment report may aggregate the vulnerability information listed above for all devices in network 101. In some aspects, IoT device monitoring component 106 may transmit the vulnerability assessment report to a device associated with an administrator of network 101 (e.g., a smartphone of the user of devices 102). In other aspects, IoT device monitoring component 106 may display the vulnerability assessment report on a graphical user interface of a device where component 106 is installed.

At 520, vulnerability scanner 118 performs a remediation action to resolve the detected vulnerabilities. Vulnerability scanner 118 may refer to vulnerabilities database 120, which indicates the plurality of remediation actions that can be performed for the vulnerabilities associated with a particular device type. For example, for a smart lightbulb, remediation actions may include, but are not limited to, rebooting the smart lightbulb, factory resetting the smart lightbulb, adjusting the dimming setting (e.g., an on/off feature may appear not to work because the dimming percentage is very low), toggling the on/off setting, blocking a connection between device 102a and the unknown entity, etc.

It should be noted that the plurality of packets intercepted at 502 may be used to identify other devices as well. For example, detection module 108 may identify, from the plurality of packets, another subset of packets corresponding to a second device (e.g., device 102b) of network 101. Detection module 108 may extract another plurality of features representing device behavior from the another subset of packets and may embed the another plurality of features into another input vector. Detection module 108 may execute machine learning algorithm 110 that receives the another input vector and outputs the different device type of the second device. For example, machine learning algorithm 110 may indicate that the device type of device 102b is "smart security camera." Accordingly, vulnerability scanner 118 may identify the different security scan specific to the different device type from vulnerabilities database 120 and may perform the different security scan. For example, the smart security camera may steam live video, may transmit information about movement in a frame, and may have several different modes (e.g., night vision, thermal vision, etc.). The different security scan may evaluate the functionality of these functions and modes and detect a vulnerability. Examples of vulnerabilities may be a dip in video quality (e.g., resolution that should be 1080p may drop to 480p due to bandwidth issues), video streams being forwarded to an unknown entity, night vision mode being inactive in a night-time setting, etc. In some aspects, in response to detecting a vulnerability based on the different security scan, vulnerability scanner 118 may generate a vulnerability assessment report for the second device.

Vulnerability scanner 118 may also execute a remediation action that can resolve the vulnerability as listed in vulnerabilities database 120. For example, remediation actions for a "smart security camera" device type may include, but are not limited to, lowering frame rate to improve the resolution, blocking the connection between the camera and the unknown entity, activating night vision in a night-time setting, etc.

Figure 6:
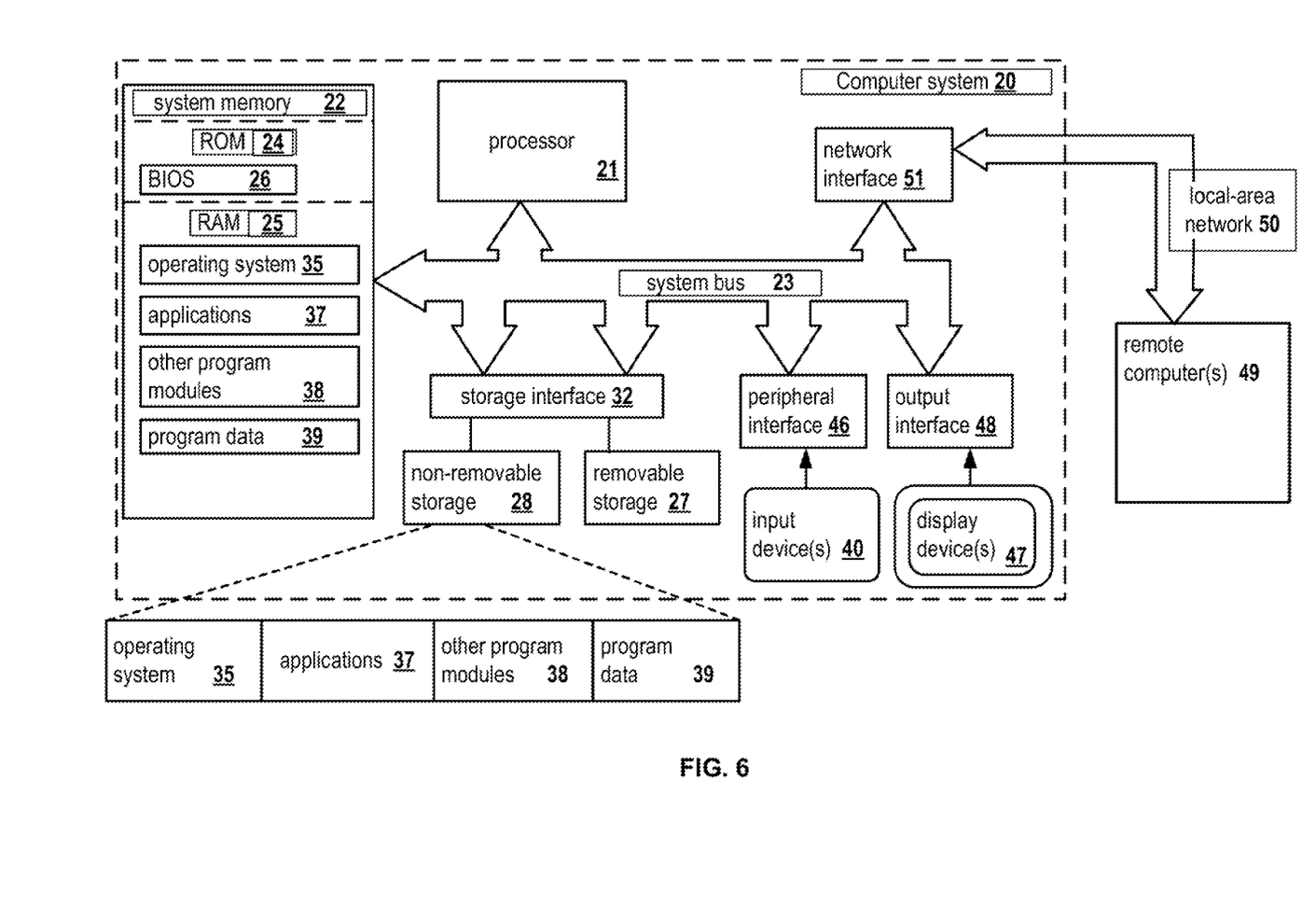
FIG. 6 presents an example of a general-purpose computer system on which aspects of the present disclosure can be implemented.

FIG. 6 is a block diagram illustrating a computer system 20 on which aspects of systems and methods for detecting vulnerabilities in IoT devices may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting vulnerabilities in devices within a network, the method comprising:
   intercepting a plurality of packets being transmitted in a network with a plurality of devices;
   identifying, from the plurality of packets, a subset of packets corresponding to a first device of the network;
   extracting a plurality of features representing device behavior from the subset of packets;
   embedding the plurality of features into an input vector;
   executing a machine learning algorithm that receives the input vector and outputs a device type of the first device, wherein the machine learning algorithm has a zero-shot framework and is trained using a training dataset comprising network traffic information pre-labelled into a set of seen device types and a list of attributes of each respective device type of the seen device types, wherein an attribute in the list comprises a relationship of each device of a particular device type with other devices, and wherein a true device type of the first device is not in the seen device types;
   performing, for the first device, a security scan specific to the device type classified by the machine learning algorithm to detect vulnerabilities in the first device; and
   in response to detecting a vulnerability based on the security scan, generating a vulnerability assessment report for the first device.

2. The method of claim 1, wherein a different security scan is performed for a different device type.

3. The method of claim 2, further comprising:
   identifying, from the plurality of packets, another subset of packets corresponding to a second device of the network;
   extracting another plurality of features representing device behavior from the another subset of packets;
   embedding the another plurality of features into another input vector;
   executing the machine learning algorithm that receives the another input vector and outputs the different device type of the second device;
   performing, for the second device, the different security scan specific to the different device type to detect vulnerabilities in the second device; and in response to detecting a vulnerability based on the different security scan, generating a vulnerability assessment report for the second device.

4. The method of claim 1, wherein identifying the subset of packets comprises:
   determining a device identifier in a first packet of the plurality of packets; and
   identifying, from the plurality of packets, the subset of packets that include the device identifier.

5. The method of claim 1, wherein the machine learning algorithm further outputs a respective prediction probability that indicates an accuracy of a predicted device type, further comprising:
   performing, for the first device, the security scan in response to determining that a prediction probability associated with the first device is greater than a threshold probability.

6. The method of claim 5, wherein the security scan is not performed for devices for which prediction probabilities associated with corresponding predictions are not greater than the threshold probability.

7. The method of claim 1, wherein the plurality of features are one or both of: sequence-based features obtained by extracting raw values for each packet in a continuous sequence, and aggregation-based features obtained by engineering aggregate features from network traffic sessions, wherein a network traffic session is a time-window of packets generated by a given device.

8. The method of claim 1, wherein an attribute of the list of attributes describes one of: a type of device and a network parameter of the device.

9. The method of claim 1, further comprising performing a remediation action that resolves the detected vulnerability of the first device.

10. A system for detecting vulnerabilities in devices within a network, comprising:
    a memory; and
    a hardware processor communicatively coupled with the memory and configured to:
      intercept a plurality of packets being transmitted in a network with a plurality of devices;
      identify, from the plurality of packets, a subset of packets corresponding to a first device of the network;
      extract a plurality of features representing device behavior from the subset of packets;
      embed the plurality of features into an input vector;
      execute a machine learning algorithm that receives the input vector and outputs a device type of the first device, wherein the machine learning algorithm has a zero-shot framework and is trained using a training dataset comprising network traffic information pre-labelled into set of seen device types and a list of attributes of each respective device type of the seen device types, wherein an attribute in the list comprises a relationship of each device of a particular device type with other devices, and wherein a true device type of the first device is not in the seen device types;
      perform, for the first device, a security scan specific to the device type classified by the machine learning algorithm to detect vulnerabilities in the first device; and
      in response to detecting a vulnerability based on the security scan, generate a vulnerability assessment report for the first device.

11. The system of claim 10, wherein a different security scan is performed for a different device type.

12. The system of claim 11, wherein the hardware processor is further configured to:
    identify, from the plurality of packets, another subset of packets corresponding to a second device of the network;
    extract another plurality of features representing device behavior from the another subset of packets;
    embed the another plurality of features into another input vector;
    execute the machine learning algorithm that receives the another input vector and outputs the different device type of the second device;
    perform, for the second device, the different security scan specific to the different device type to detect vulnerabilities in the second device; and
    in response to detecting a vulnerability based on the different security scan, generate a vulnerability assessment report for the second device.

13. The system of claim 10, wherein the hardware processor is further configured to identify the subset of packets by:
    determining a device identifier in a first packet of the plurality of packets; and
    identifying, from the plurality of packets, the subset of packets that include the device identifier.

14. The system of claim 10, wherein the machine learning algorithm further outputs a respective prediction probability that indicates an accuracy of a predicted device type, wherein the hardware processor is further configured to:
    perform, for the first device, the security scan in response to determining that a prediction probability associated with the first device is greater than a threshold probability.

15. The system of claim 14, wherein the security scan is not performed for devices for which prediction probabilities associated with corresponding predictions are not greater than the threshold probability.

16. The system of claim 10, wherein the plurality of features are one or both of:
    sequence-based features obtained by extracting raw values for each packet in a continuous sequence, and aggregation-based features obtained by engineering aggregate features from network traffic sessions, wherein a network traffic session is a time-window of packets generated by a given device.

17. The system of claim 10, wherein an attribute of the list of attributes describes one of: a type of device and a network parameter of the device.

18. A non-transitory computer readable medium storing thereon computer executable instructions for detecting vulnerabilities in devices within a network, including instructions for:
    intercepting a plurality of packets being transmitted in a network with a plurality of devices;
    identifying, from the plurality of packets, a subset of packets corresponding to a first device of the network;
    extracting a plurality of features representing device behavior from the subset of packets;
    embedding the plurality of features into an input vector;
    executing a machine learning algorithm that receives the input vector and outputs a device type of the first device, wherein the machine learning algorithm has a zero-shot framework and is trained using a training dataset comprising network traffic information pre-labelled into a set of seen device types and a list of attributes of each respective device type of the seen device types, wherein an attribute in the list comprises a relationship of each device of a particular device type with other devices, and wherein a true device type of the first device is not in the seen device types;

performing, for the first device, a security scan specific to the device type classified by the machine learning algorithm to detect vulnerabilities in the first device; and in response to detecting a vulnerability based on the security scan, generating a vulnerability assessment report for the first device.

* * * * *